US011969766B2

(12) United States Patent
Quick

(10) Patent No.: US 11,969,766 B2
(45) Date of Patent: Apr. 30, 2024

(54) ARTICLE SORTING AND NESTING DEVICE

(71) Applicant: James L. Taylor Manufacturing Company, Inc., Poughkeepsie, NY (US)

(72) Inventor: Bradley S. Quick, Staatsburg, NY (US)

(73) Assignee: James L. Taylor Manufacturing Company, Inc., Poughkeepsie, NY (US)

( * ) Notice: Subject to any disclaimer, the term of this patent is extended or adjusted under 35 U.S.C. 154(b) by 0 days.

(21) Appl. No.: 17/387,302

(22) Filed: Jul. 28, 2021

(65) Prior Publication Data

US 2023/0226577 A1 Jul. 20, 2023

(51) Int. Cl.
*B07C 5/36* (2006.01)
*B07C 5/10* (2006.01)
*B07C 5/342* (2006.01)

(52) U.S. Cl.
CPC ................ *B07C 5/362* (2013.01); *B07C 5/10* (2013.01); *B07C 5/342* (2013.01)

(58) Field of Classification Search
CPC .... B07C 5/02; B07C 5/04; B07C 5/10; B07C 5/14; B07C 5/342; B07C 5/362
USPC .......................................................... 209/518
See application file for complete search history.

(56) References Cited

U.S. PATENT DOCUMENTS 3,687,178 A * 8/1972 Golick ................. B23Q 16/001 83/369
4,098,407 A * 7/1978 Moore ................... B65G 47/44 414/268
4,195,737 A * 4/1980 Rysti ........................ B65G 1/08 414/789.6
4,205,751 A * 6/1980 Rysti .......................... B07C 5/14 209/933
4,324,335 A * 4/1982 Conway ................ B07C 5/3422 356/627
6,016,922 A * 1/2000 Burman .................... B07C 5/14 209/621
6,722,844 B2 * 4/2004 Lunden ................ B65G 57/245 414/789.5
2005/0132667 A1 * 6/2005 McLeod ................ B65G 65/06 53/531

(Continued)

FOREIGN PATENT DOCUMENTS

CN 108325875 A * 7/2018
CN 110681603 A * 1/2020

(Continued)

*Primary Examiner* — Gene O Crawford
*Assistant Examiner* — Muhammad Awais
(74) *Attorney, Agent, or Firm* — Laubscher & Fretwell, P.C.

(57) ABSTRACT

An article sorting nesting device includes an article delivery device, a rack assembly and a collection device under operation by a controller to transport, sort and nest random articles into a particular configuration. The rack assembly is arranged at an angle and incrementally displaced relative to the delivery device to position empty shelves adjacent the delivery device to successively receive the articles by gravity. The controller controls which articles from the shelves are delivered in sequence to a collection device based on a sensed length, width or color of each article. The collection device collects the selected sequential articles and arranges them in the particular configuration.

10 Claims, 4 Drawing Sheets

(56) References Cited

U.S. PATENT DOCUMENTS

| | | | | |
|---|---|---|---|---|
| 2008/0223767 | A1* | 9/2008 | Ahrens | B07C 5/04 198/377.04 |
| 2012/0138514 | A1* | 6/2012 | Janssens | G01N 21/21 250/225 |
| 2012/0325621 | A1* | 12/2012 | Koller | B65G 15/44 198/716 |

FOREIGN PATENT DOCUMENTS

| | | | | | |
|---|---|---|---|---|---|
| CN | 111014068 | A | * | 4/2020 | B07C 5/02 |
| CN | 111545483 | B | * | 3/2021 | |
| EP | 2045024 | A1 | * | 4/2009 | B07C 5/02 |

* cited by examiner

ARTICLE SORTING AND NESTING DEVICE

BACKGROUND OF THE INVENTION

The manufacturing of hardwood flooring usually involves ripping lumber into long fixed widths and then machining the lengths of lumber to create tongues and grooves on the edges as well as grooves on the bottom surface. The lengths of lumber are then chopped into shorter boards, usually for the purpose of eliminating knots and other defects. The boards are then fed through a machine that creates tongues and grooves on the opposite ends of the boards.

As a result of the chopping process, the resulting boards are usually of random length. These random lengths are then packaged into bundles, either for sale, or for storage until further processing. The process of building these bundles is referred to as "nesting" in the industry. A typical nested bundle of 2¼ inches wide flooring boards will be approximately 84 inches long. The bundle will typically be composed of five layers of flooring boards. Each layer will be composed of three rows of flooring boards. Each row is typically composed of from one to five random length boards. Such a nested bundle will contain approximately 20 square feet of flooring.

Historically, bundles of flooring were nested by hand. Random length boards would be fed via a conveyor belt to a pile of boards. A human operator would then choose boards from the pile such that the combination of chosen boards is close to 84" long to create a row. Typically, the operator would complete this process fifteen times to create a bundle with three rows per layer and five layers per bundle. Once a bundle is completed, it is slid onto a conveyor for transport to a strapping or boxing device.

More recently, machines have been developed to perform the nesting process automatically. One such machine of this type is the Cameron Flooring Nester. With the Cameron Nester, random length boards are placed onto a roller conveyor in an end-to-end arrangement. The roller conveyor accumulates the boards and at the end of the conveyor, the boards are released one at a time. Each board is then pushed laterally to an area where it is measured using laser time-of-flight distance sensors.

Once a board is measured, it moves laterally on a conveyor formed from a plurality of chains. Mounted over the chain conveyor is a series of "scoops," typically twelve. The scoops are individually controlled by air cylinders which are energized and de-energized to pick boards up off of the chain conveyor, as the chain conveyor continues to move. Once all of the scoops are full, a computer determines which combination of boards from the boards in the scoops will produce a row that is nearest in total length to the desired bundle length. The computer then energizes and de-energizes the scoops containing the selected boards at the proper times to place those boards back onto the chain conveyor.

The selected boards then drop off of the end of the chain conveyor onto an inclined roller conveyor that accumulates the boards into a row. The rows are then arranged into layers which are then packaged into bundles.

On a machine of this type, the chain conveyor with a large number, i.e. twelve, scoops occupies a large amount of floor space. In addition, the scooping and un-scooping process is difficult to reliably achieve.

SUMMARY OF THE INVENTION

Accordingly, it is a primary object to provide an article sorting and nesting device which is more compact and efficient. It includes an article delivery device for successively supplying a plurality of articles which vary in configuration. A rack assembly is arranged adjacent to the delivery device and includes a plurality of spaced shelves. A displacement device displaces the rack assembly relative to the article delivery device so that each article is delivered to an empty shell. A collection assembly collects a plurality of selected articles from the shelves in a selected orientation.

The device further includes at least one sensor connected with the delivery device for detecting the length, width, and/or color of the article. The delivery device includes at least one gate for retaining an article for detection by the sensor, and the collection assembly includes at least one gate for receiving articles released from the shelves of the rack assembly. The collection assembly gate includes a plurality of driven rollers which longitudinally displace the articles successively after the articles are received from the rack assembly. At least one gate is also provided for the rack assembly. The rack assembly gate is operable between a closed position wherein an article from the delivery device is retained on a shelf and an open position wherein an article from the shelf is released to the collection assembly.

A controller is connected with the delivery device and with the delivery, rack assembly, and collection gates to control the operation thereof and successively transport the articles through the device to create a plurality of rows of articles.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
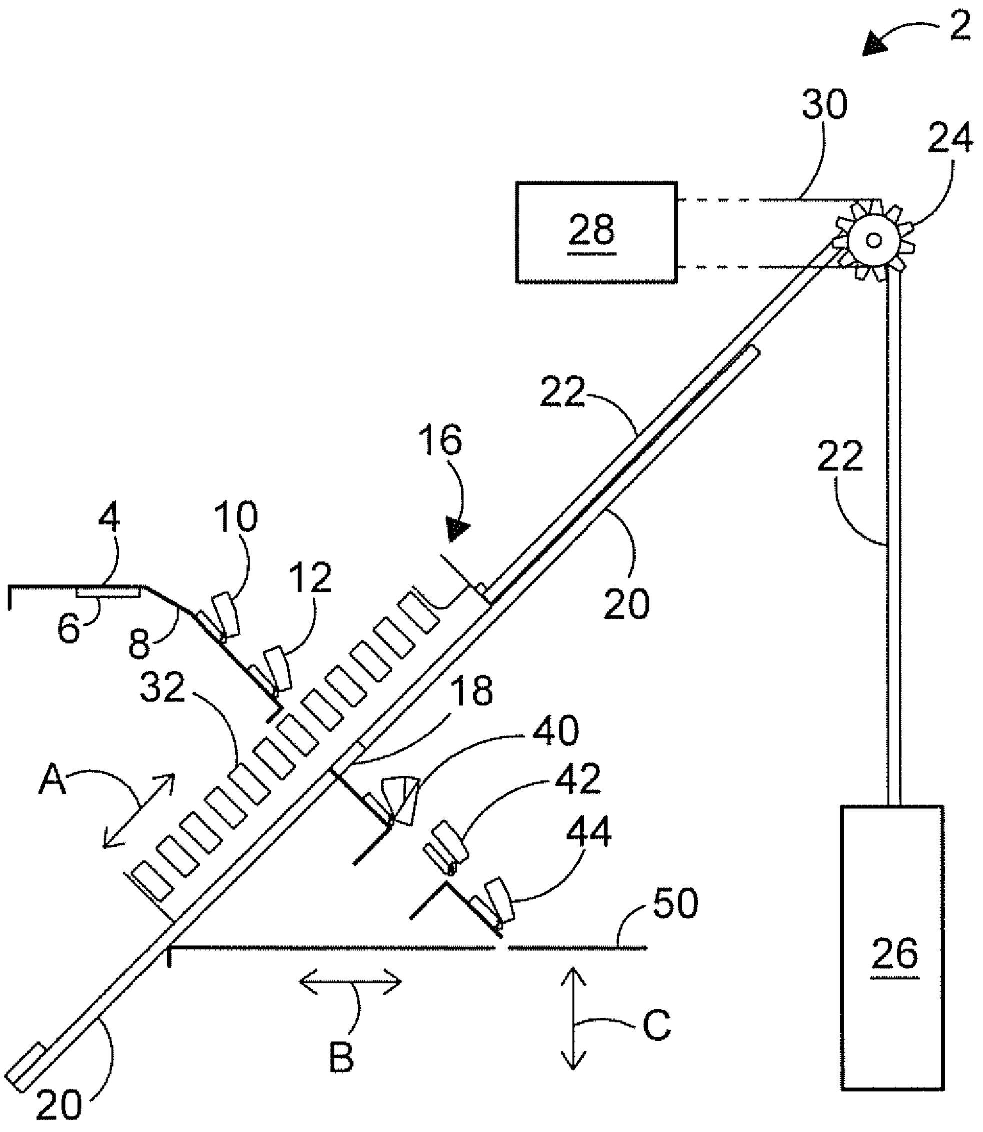
FIG. 1 is a side schematic view of the article sorting and nesting device according to the invention.
Figure 2:
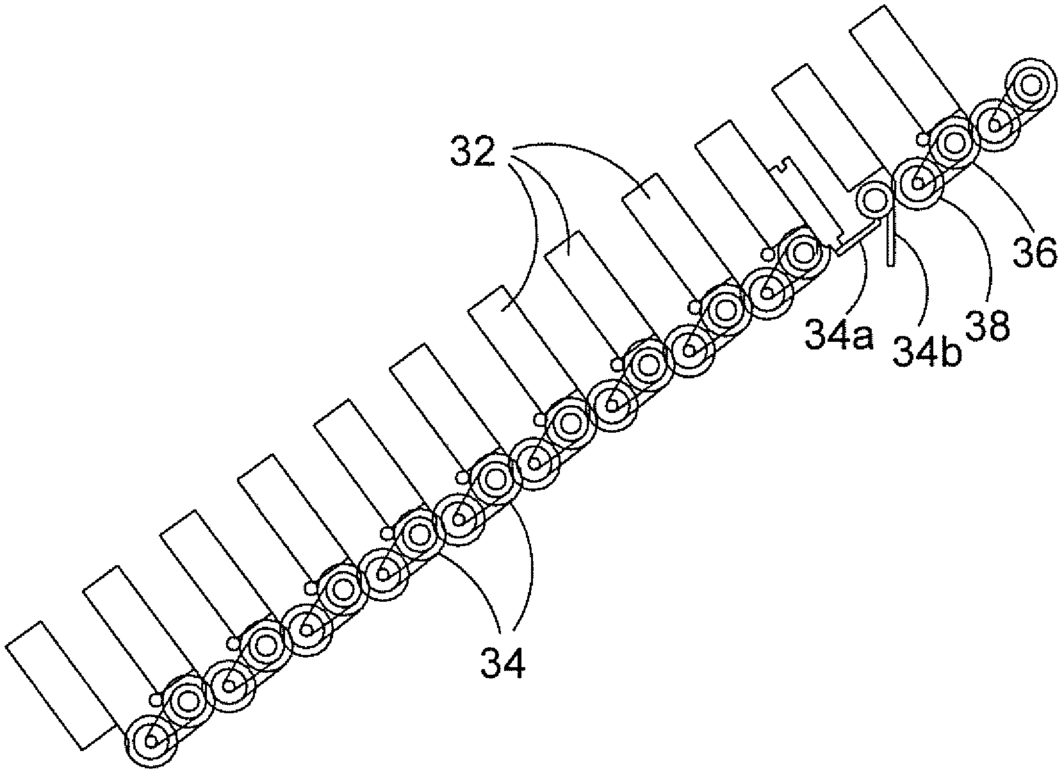
FIG. 2 is a detailed side view of the rack assembly of the device of FIG. 1.
Figure 3:
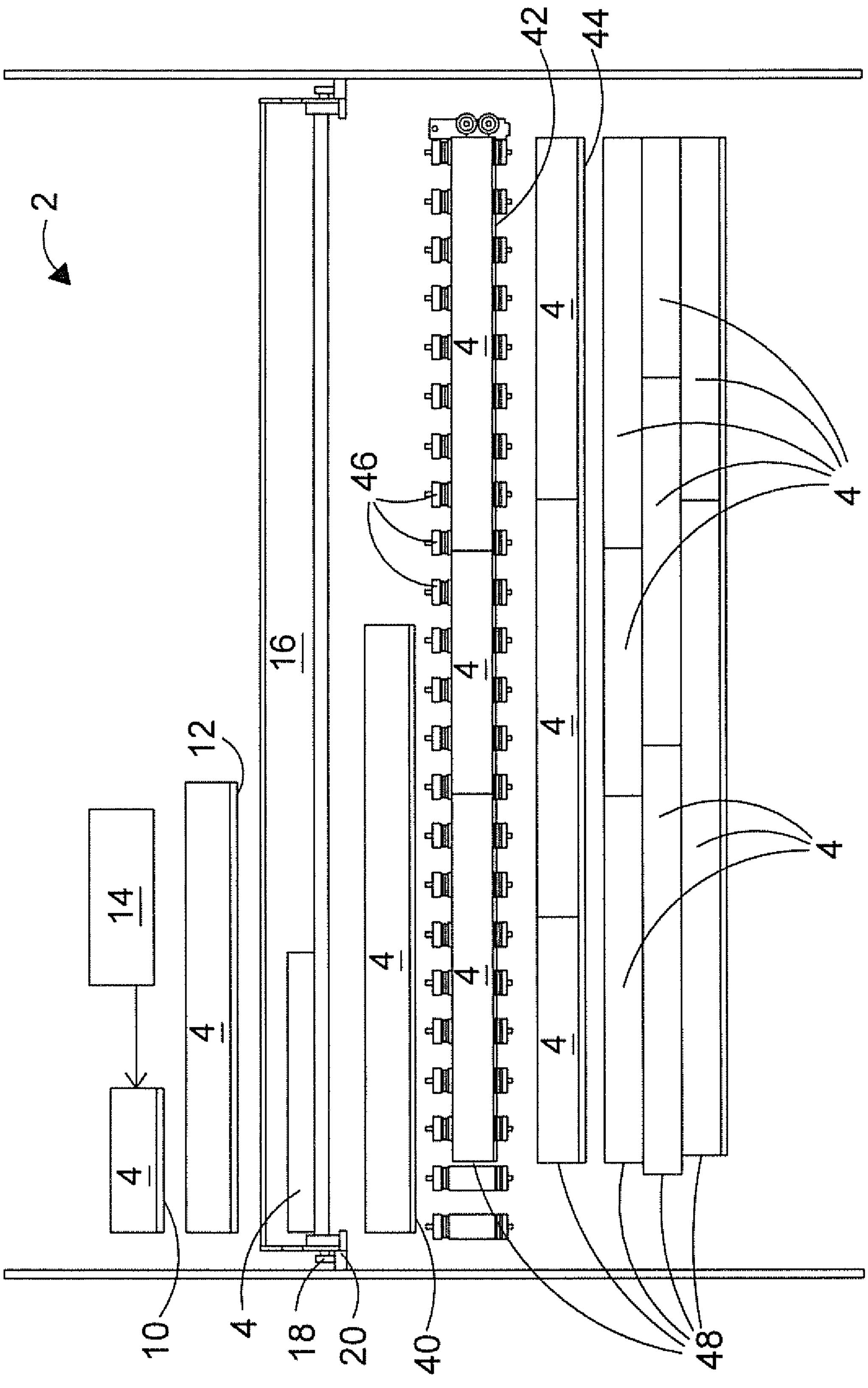
FIG. 3 is a top schematic view of the device of FIG. 1.

Referring to FIGS. 1-3, the article sorting and nesting device according to the invention will be described. While the device is particularly useful for sorting and assembling a plurality of flooring boards which may have different lengths, widths, or colors, it will be appreciated that the device is suitable for sorting random articles in a variety of manners or configurations as desired by the operator.

A delivery device 2 is provided to successively supply generally flat articles 4 such as flooring boards from a horizontal infeed table 6 to a ramp 8 arranged at an incline so that the articles slide downwardly. Arranged adjacent to the delivery ramp is a gate 10 or catch which pivots between catch and release positions. By way of example, the gate includes a mechanism such as an air cylinder operable to pivot the gate. In the closed position, the gate intercepts an article on the ramp 8 and retains the article. In the release position, the gate is pivoted to allow the article to slide downwardly on the ramp to an optional second gate 12. As shown in FIG. 3, a sensor 14 is arranged adjacent to the first gate 10. The sensor detects a characteristic of the article, such as its length, width, and/or color. In a preferred embodiment, the sensor is a time-of-flight laser distance sensor which measures the length of the article.

Arranged adjacent and below the ramp 8 of the delivery device is a rack assembly 16. As shown in FIG. 1, the rack assembly is also arranged on an incline which is preferably perpendicular to the delivery device. The rack assembly includes a wheeled carriage 18 arranged on a track 20 or frame. The upper end of the carriage is connected with a roller chain 22 which passes over a sprocket 24 mounted on the frame. A counterweight 26 is connected with the other end of the roller chain. A servo motor 28 is connected with the sprocket 24 via a toothed belt 30. As will be understood by those of ordinary skill in the art, the servo motor rotates the sprocket via the toothed belt in opposite directions as shown by the arrow A to move the carriage relative to the delivery device.

The rack assembly 16 includes a plurality of parallel spaced shelves 32 which are mounted on the carriage 18. In the embodiment shown, twelve shelves are provided, although it will be readily apparent that any number of shelves may be provided. The shelves are configured to catch and retain articles 4 released from second gate 12 of the delivery device.

Referring to FIG. 2, each shelf 32 includes a gate 34. Each gate is connected with a pivotal bearing 36 or wheel. A roller 38 is used to pivot each bearing to pivot the gate between open and closed positions. Thus, the bearing serves two purposes. First, it supports the rack assembly when the shelf gate is in the closed position. Second, the bearing is used as a control mechanism that is used to open the shelf gate. A short section of the track which supports the rack assembly is movable in a direction perpendicular to the length of the track under control of an air cylinder. The movable section of track is positioned such that when the air cylinder is activated, the moveable section of track will act on the bearing and open the rack gate for the shelf which is aligned with the delivery ramp. In FIG. 2, in which some components have been removed for clarity, The third gate is shown in solid lines 34*a* in the closed position to retain an article 4 and is shown in phantom lines 34*b* in the open position to release the article.

In operation, the servo motor 28 displaces the rack assembly to position an empty shelf adjacent to the delivery device. As will be developed below, the second gate 12 of the delivery device opens to deposit an article from the second gate onto the empty shelf of the rack assembly. Because of the inclination of the delivery device and the positioning of the rack assembly relative thereto, articles are transferred from the delivery device to the rack assembly via gravity.

A collection assembly is provided below the rack assembly as shown in FIG. 1 to receive selected articles released from the rack assembly. More particularly, the collection assembly includes at least one gate below the rack assembly on which a plurality of articles are collected. In the preferred embodiment shown in the drawing, three spaced gates 40, 42, and 44 are provided. As with the gates 10 and 12 of the delivery device, the gates 40, 42 and 44 are pivotal between catch and release positions. The first gate 40 receives an article 4 from the rack assembly and acts as a buffer to hold the article. The second gate 42 receives an article from the first gate. However, the second gate includes a conveyor formed of a plurality of rollers 46 which are operable to laterally transport an article. Accordingly, a plurality of articles 4 may be accumulated on the second gate 42 and arranged in an end-to-end configuration in a row 48 as shown in FIG. 3. When the cumulative length of the row of boards on the second gate reaches a given range, the second gate is pivoted to its release position and the row of collected boards are deposited by gravity into the third gate 44 which also acts as a buffer. When the third gate is pivoted to its open or release position, the row of boards are deposited by gravity onto a thin sheet, also known as a stripper sheet. Subsequent rows are added adjacent to the previous rows until a layer of a selected number of rows of boards are collected on the sheet. The layer is then stripped from the sheet and deposited on a lift table 50. The sheet is movable laterally as shown by the arrow B and the lift table is movable vertically as shown by the arrow C in FIG. 1. In this manner, rows of boards may be accumulated in layers and stacked in bundles.

Figure 4:
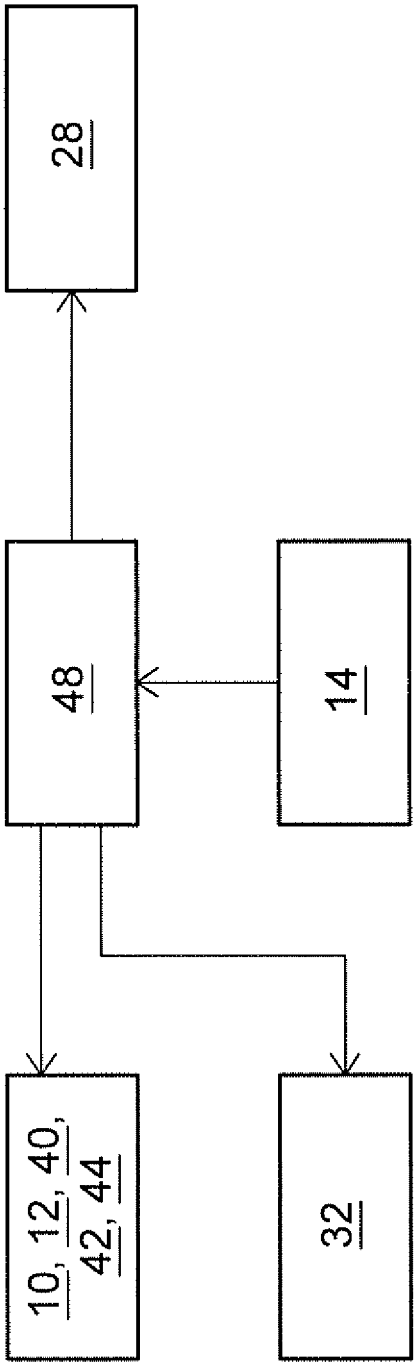
FIG. 4 is a block diagram of the control mechanism for the device of FIG. 1.

Referring now to FIG. 4, the sorting and nesting device according to the invention includes a controller 48 which receives input signals from the sensor 14 and delivers control signals to the servo motor 28, the gates 10 and 12 of the delivery device, the gates 40, 42, and 44 of the collection assembly and the shelves 32 of the rack assembly. The controller may be programmed by the operator in accordance with the characteristics of the articles to be detected by the sensor 14 and the desired orientation and configuration of the collected articles exiting the device.

By way of example, the operation of the sorting and nesting device according to the invention will be described in connection with nesting flooring boards of different lengths. A first board is pushed manually or automatically on from the infeed table 6 onto the ramp 8 of the delivery device where is slides downwardly by gravity into the first gate 10 of the deliver device. The sensor measures the length of the first board and sends a signal representative of the first board length to the controller 48. After receiving the signal from the sensor for the first board, the controller opens the first gate and closes the second gate 12 of the delivery device so that the first board slides into the second gate 12 and a second board from the infeed table is delivered to the first gate. This process is repeated for each successive board that enters the delivery device.

The controller 48 further controls the servo motor 28 to position an empty shelf 32 of the rack assembly 16 adjacent to the second gate 12 of the delivery device. That is, boards are successively delivered to empty shelves of the rack assembly in an indexing manner as subsequent boards enter into and are delivered from the delivery device. The controller keeps track of the size of each board in each shelf.

The controller further controls the shelf gates to sequentially deposit selected boards from the rack assembly to the first gate 40 of the collection assembly and subsequently from the first gate 40 into the second gate 42 of the collection assembly. Within the second gate 42 of the collection assembly, a plurality of boards is accumulated in a row. Each board in a row is selected by the controller from among all of the boards in the shelves of the rack assembly. That is, to create a row having a length within a predetermined range, the controller selects individual boards from the shelves of the rack assembly so that the total length of the selected boards falls within the predetermined length and then sequentially operates the rack assembly to deposit the selected boards on the first gate 40 of the collection assembly which in turn are delivered to the second gate 42 to form the row. Once the row has been created, the controller energizes the second gate to its open position where the row of boards from the second gate is deposited into the third gate 44 of the collection assembly. The controller then energizes the third gate 44 of the collection assembly to deposit the row onto the stripper sheet where rows of boards of a length within a given range are arranged in a layer which is then deposited onto the lifting table where the layers are stacked to create a bundle of boards according to the programmed orientation and configuration.

Accordingly, only the second and third gates of the collection assembly contain multiple boards arranged in a row. The controller indexes the delivery device, the servo motor, the shelves of the rack assembly and the controller assembly in a timed sequence to quickly and efficiently transport, sort, and nest the boards for subsequent bundling. After boards are transferred from each shelf of the rack assembly onto the collection assembly, the now empty shelf is replenished with another board from the delivery device during the next sequence. Accordingly, the rack assembly is maintained at an almost full state with a random board on each shelf to maximize the efficiency of the device.

While the preferred forms and embodiments of the invention have been illustrated and described, it will become apparent to those of ordinary skill in the art that various changes and modifications may be made without deviating from the inventive concepts set forth above.

What is claimed is:

1. An article sorting and nesting device, comprising (a) an article delivery device for successively supplying a plurality of articles, said article delivery device including (1) a sensor for detecting at least one of a length, width, and color of each article; and (2) at least one gate for retaining an article for detection by said sensor;

(b) a rack assembly arranged adjacent to said article delivery device and including a plurality of spaced shelves;

(c) a displacement device for displacing said rack assembly relative to said article delivery device so that each article is delivered to an empty shelf; and (d) a collection assembly for collecting a plurality of selected articles from said shelves in a selected orientation.

2. An article sorting and nesting device, comprising (a) an article delivery device for successively supplying a plurality of articles, said article delivery device including a sensor for detecting at least one of a length, width, and color of each article;

(b) a rack assembly arranged adjacent to said article delivery device and including a plurality of spaced shelves, said rack assembly including at least one gate operable between a closed position wherein an article from said article delivery device is retained on a shelf and an open position wherein an article from said shelf is released to said collection assembly;

(c) a displacement device for displacing said rack assembly relative to said article delivery device so that each article is delivered to an empty shelf; and (d) a collection assembly for collecting a plurality of selected articles from said shelves in a selected orientation.

3. An article sorting and nesting device as defined in claim 2, wherein each shelf of said rack assembly includes a gate.

4. An article sorting and nesting device as defined in claim 2, wherein said collection assembly includes at least one gate for receiving articles released from said shelves.

5. An article sorting and nesting device as defined in claim 4, wherein said at least one collection assembly gate includes a plurality of driven rollers which longitudinally displace said articles successively after said articles are released from said shelves.

6. An article sorting and nesting device as defined in claim 5, and further comprising a controller connected with said displacement device, said at least one delivery gate, said rack gate and said at least one collection gate to control the displacement of said delivery device and the release of said delivery, shelf and collection gates to successively transport the articles through the device, whereby a plurality of rows of articles are created.

7. An article sorting and nesting device as defined in claim 6, wherein said delivery device includes a second gate downstream of a first gate to retain an article detected by said sensor at said first gate prior to delivery to said rack assembly.

8. An article sorting and nesting device as defined in claim 6, wherein said collection device includes at least three gates, a first gate being arranged adjacent to said rack assembly for retaining an article from a shelf, a second gate including said driven rollers for longitudinally displacing articles from said first collection gate, and a third gate for retaining a plurality of longitudinally arranged articles from said second gate.

9. An article sorting and nesting device as defined in claim 2, wherein said rack assembly is arranged at an angle and said articles released from said shelves are transferred to said collection assembly by gravity.

10. An article sorting and nesting device, comprising (a) an article delivery device for successively supplying a plurality of articles each having a longitudinal axis and random widths and lengths, respectively, said article delivery device including a sensor for measuring at least one of a length and width of each article;

(b) a rack assembly arranged adjacent to said article delivery device and including a plurality of spaced shelves;

(c) a displacement device for displacing said rack assembly relative to said article delivery device so that each article is delivered to an empty shelf; and (d) a collection assembly for collecting a plurality of selected articles from said shelves in a selected orientation, said collection assembly arranging said articles in one of a longitudinal direction having a collective length within a given range and a lateral direction having a collective width within a given range.

* * * * *